United States Patent [19]
Morita

[11] Patent Number: 4,881,131
[45] Date of Patent: Nov. 14, 1989

[54] PLOTTER ADJUSTMENT CIRCUIT

[75] Inventor: Hiroshi Morita, Tokyo, Japan

[73] Assignee: Seiko Instruments Inc., Chiba, Japan

[21] Appl. No.: 212,302

[22] Filed: Jun. 27, 1988

[30] Foreign Application Priority Data

Jun. 25, 1987 [JP] Japan ................................. 62-158573

[51] Int. Cl.$^4$ ........................ H04N 1/21; H04N 1/00; G01D 9/42; G01D 15/06
[52] U.S. Cl. .................................... 358/296; 346/150; 346/108; 346/24; 358/304
[58] Field of Search ............... 358/304, 256, 296, 300, 358/302, 280; 346/24, 150, 153.1, 154, 160, 108, 107 R Primary Examiner—E. A. Goldberg
Assistant Examiner—Scott A. Rogers
Attorney, Agent, or Firm—Spensley Horn Jubas & Lubitz

[57] ABSTRACT

A plotter adjustment circuit for shifting plot data uniformly inside a print region of the paper such that the print region is not cut upon output. The plotter adjustment circuit includes a conversion unit for converting input plot data into raster data; a print unit for plotting figures responsive to input raster data; a counter-based shift circuit connected between the conversion unit and the print unit for shifting raster data from the conversion unit by an input value and providing the shifted raster data to the print unit; and a non-volatile memory connected to the shift circuit means for storing the input shift value.

5 Claims, 2 Drawing Sheets

PLOTTER ADJUSTMENT CIRCUIT

BACKGROUND OF THE INVENTION

1. Field of the Invention

This invention relates to a plotter having an attached paper cutter, and more particularly to such a plotter having an adjustment circuit for shifting plot data (such as a diagram or graph) uniformly inside a print region of the paper such that the print region is not cut upon output.

2. Description of Related Art

In conventional plotters having a paper cutter fixed to a main body for cutting the paper upon output, it is often necessary to adjust the print region (in which the plot data is printed) towards or away from the output direction of the paper to avoid cutting through the print region upon output of the paper. In the past, the position of the print region has been shifted by converting the original plot data by a user-input shift value. The conversion calculations were performed in an appropriately programmed conversion unit which converted the original plot data into raster scan data and performed the shift function by applying the input shift value to the plot data. If the amount of plot data was great in such a plotter, then calculation of the converted and shifted raster data required a substantial amount of time, since the conversion was done by a software program. Further, the conversion unit was also used to control the plotter printing unit. Therefore, processing speed of the overall system dropped when the plot data to be printed was great and therefore the calculation load of the conversion unit was increased.

SUMMARY OF THE INVENTION

It is therefore an object of the present invention to provide a plotter in which the print region for the plot data is shifted at high speed by means of a hardware shift unit in response to an input shift value, thereby eliminating usage of the conversion unit for performing the shift function.

It is another object of the invention to provide a plotter in which the shift value of the plot data, once input as an initial setting through an operation panel, is held in storage irrespective of the subsequent connection or disconnection of the power supply to the plotter.

The aforementioned and other objects of the present invention are accomplished by providing a plotter which includes a conversion unit for converting input plot data into raster data; a print unit for plotting figures responsive to input raster data; a counter-based shift circuit means connected between the conversion unit and the print unit for shifting raster data from the conversion unit by an input value and providing the shifted raster data to the print unit; and memory means connected to the shift circuit means for storing the input shift value.

These and other features, advantages, and details of the preferred embodiment of the present invention are set forth below, and are described with respect to the accompanying figures. Once the concepts behind the invention are known, numerous additional innovations and changes will become obvious to one skilled in the art.

DETAILED DESCRIPTION OF THE PREFERRED EMBODIMENT

Figure 1:
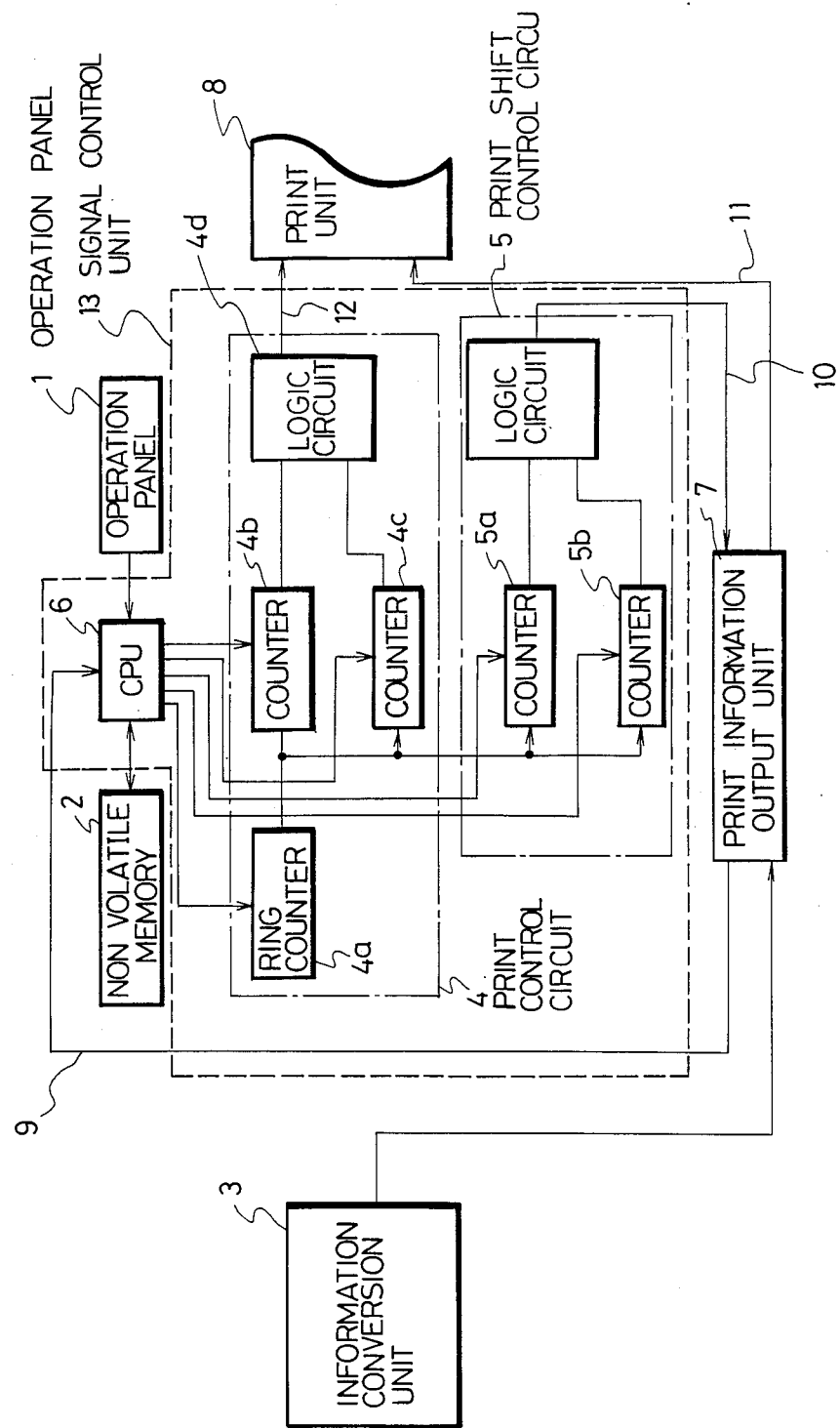
FIG. 1 is a schematic diagram of a plotter adjustment circuit according to the present invention.

As shown in FIG. 1, the present apparatus includes an operation panel 1 at which a print region shift value can be input by an operator. The input shift value is sent to a CPU 6, which stores the shift value in a non-volatile memory 2. Thus, the shift value is preserved in the non-volatile memory 2 even if power to the entire system is turned off.

An information conversion unit 3 is provided that converts plot data into raster data, in known fashion. The output of the information conversion unit 3 is coupled to a print information output unit 7, which can be implemented by means of a first-in first-out (FIFO) memory or the like. The print information output unit 7 temporarily stores the 15 raster plot data from the information conversion unit 3, and outputs an output enable signal 9 to the CPU 6 when plot data is received. The print information output unit 7 also outputs the temporarily-stored raster data to a print unit 8 when a "high" print shift signal 10 is received from a print shift control circuit 5.

In the preferred embodiment, the print unit 8 has a fixed printing head having a plurality of printing members. The printing members are linearly arranged and are sequentially driven from the left end of the print unit to the right end of the print unit. The print unit 8 prints input raster data while a print enable signal 12 is "high".

A print unit control circuit 4 controls the operation of the print unit 8. The print unit control circuit 4 includes a ring counter 4a which receives the shift value output by the CPU 6 and generates a pulse signal when the ring counter 4a counts this value down to "zero".

The print unit control circuit 4 also includes counters 4b and 4c, which start counting upon receipt of an output pulse signal from the ring counter 4a, and output a "low" signal until their respective count values becomes zero. The outputs of counters 4b and 4c are coupled to a logic circuit 4d, which outputs the print enable signal 12 to the print unit 8 when counter 4c transitions from "low" to "high", and which negates the print enable signal 12 when counter 4b transitions from "low" to "high".

The print shift control circuit 5 controls the output of the raster plot data from the print information output unit 7 to the print unit 8. The print shift control circuit 5 includes counters 5a and 5b which start counting upon receipt of an output pulse signal from the ring counter 4a, and output a "low" signal until their respective values become zero. The outputs of counters 5a and 5b are coupled to a logic circuit 5c, which outputs a print shift signal 10 when counter 5b transitions from "low" to "high", and which negates the print shift signal 10 when counter 5a transitions from "low" to "high".

Together, the print control circuit 4 and the print shift control circuit 5 comprise a signal control unit 13. In operation, an operator inputs the print region shift value through the operation panel 1. This shift value is stored in a non-volatile memory 2 through the CPU 6. The CPU 6 is programmed to calculate all of the counter values on the basis of the print region shift value, and load those values into the counters. A value equaling [the left margin dot length+the total dot length of the print head +the right margin dot length] is set into the ring counter 4a. A value equaling [the left margin dot length+the total dot length of the print head] is set into counter 4b. A value equaling the [left margin dot length] is set into counter 4c. A value equaling the [left margin dot length+the print shift value+-the total dot length of the print head] is set into counter 5a. A value equaling the [left margin dot length+the print shift value] is set into counter 5b.

When the print information output unit 7 receives raster plot data from the information conversion unit 3, the print information output unit 7 generates an output enable signal 9 coupled to the CPU 6. This enables the CPU 6, which generates a clock pulse having a period equal to the value set in the ring counter 4a. Upon receiving the clock pulse, each of the counters 4b, 4c, 5a, and 5b subtract one from the value set therein by the CPU 6 in synchronism with the clock pulse.

Upon receiving the print shift signal 10, the print information output unit 7 sends the raster plot data to the print unit 8. However, the raster plot data is not printed until the print unit 8 receives the print enable signal 12 from the print control circuit 4.

Figure 2:
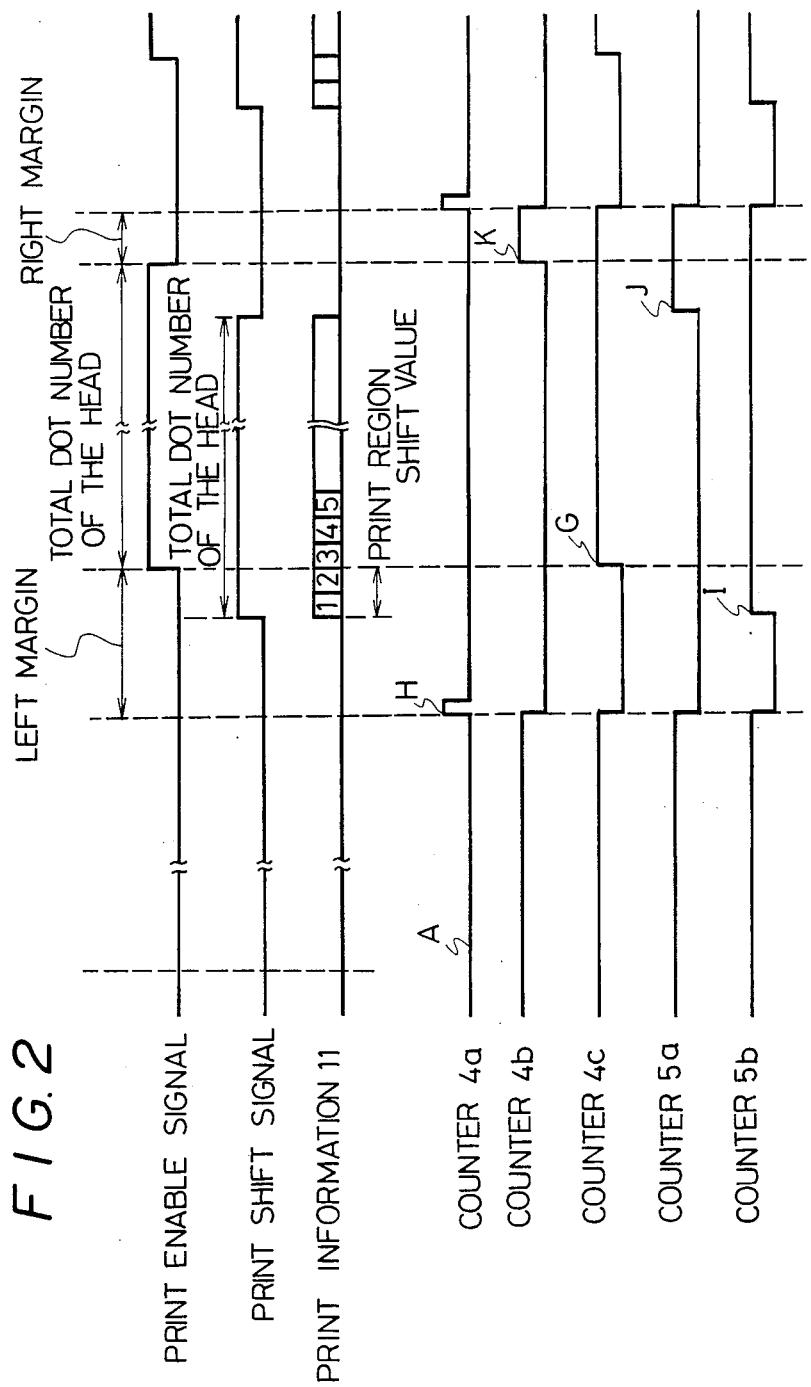
FIG. 2 is a timing chart for the schematic diagram of FIG. 1.

The operation of the signal control unit 13 will be explained with reference to the timing chart of FIG. 2. In the example given in the timing chart, plot data is to be shifted by two dots in the left direction (thus, the shift value input into the CPU 6 is some number corresponding to two dots).

First, the CPU 6 actuates the ring counter 4a at point A. After counting down the value set in the ring counter 4a, the ring counter 4a outputs a driving pulse H. This driving pulse, which is coupled to counters 4b, 4c, 5a, and 5d, causes the counters to begin counting down. During this down-counting phase, all of the counters output a "low" signal.

When the set value of counter 5b becomes zero, counter 5b outputs a "high" signal at point I. Logic circuit 5c is set and therefore outputs the print shift signal 10. The print information output unit 7 thus begins to sequentially output the temporarily stored raster plot data to the print unit 8. However, at this time, the print unit 8 is not yet enabled. Two dot periods later, counter 4c has counted down to zero, the output of counter 4c becomes "high", and the print enable signal 12 is output from logic circuit 4d to the print unit 8 at point G.

The print unit 8 drives the printing members of the printing head in accordance with the input raster data from the print information output unit 7, such that the data begins printing from the left side of the print unit 8. When counter 5a counts down to zero, thus forcing its output to a "high" level, the print shift signal 10 is negated at point J. By this time, all of the data in the current raster line has been sent from the print information output unit 7 to the print unit 8.

When counter 4b counts down to zero, thereby forcing its output "high", the print enable signal 12 is negated at point K, ending the print cycle for the current raster line. Thereafter, counters 4b, 4c, 5a, and 5b are again set to their initial values by the CPU 6, and wait for the arrival of the next driving pulse H in order to print the next raster line of data. The operation is repeated for each raster line until all of the plot data has been printed. As a result of the above operation, each raster line of data is shifted left by two dots.

It should be noted that the following relationship exists between the values of the counters described above:

counter 4a>counter 4b>counter 4c counter 4a>counter 5a>counter 5b

Further, the length of the print enable signal 12 is equal to the length of the print shift signal 10, both of which equal the dot length of the print head.

When the counter values satisfy the relation counter 4c>counter 5b, the print region is shifted to the left side of the print unit 8, and when the counter values satisfy the relation counter 4c>counter 5b, the print region is shifted to the right side of the print unit 8.

While a particular embodiment of the invention is described above, it should be understood that changes can be made without departing from the spirit or scope of the invention. Therefore, this invention is not to be limited to the specific embodiment discussed and illustrated herein, but rather by the following claims.

I claim:

1. A plotter for plotting data in a selected print region, comprising:
   A. a conversion means for converting input plot data into raster data;
   B. shift circuit means connected to said conversion means for receiving raster data from said conversion means, said shift circuit means comprising: print control means for generating and outputting a print enable signal, and output means for outputting raster data received from said conversion means at a time different from the time of outputting of the print enable signal, the time different being determined by a shift value;
   C. a print means having a print head and connected to said shift circuit means for receiving the raster data outputted by said output means and the print enable signal outputted by said print control means, and for plotting figures represented by the plot data in response to receipt of the print enable signal;
   D. input means connected to said shift circuit means for supplying the shift value thereto; and
   E. memory means connected to said input means for storing the shift value.

2. A plotter as claimed in claim 1 wherein the memory means comprises non-volatile memory.

3. A plotter as claimed in claim 1 wherein the print control means includes:
   A. first counter means for counting the sum of a left margin dot length and the total dot length of the print head of the print means;
   B. second counter means for counting the left margin dot length; and
   C. first logic means for generating the print enable signal in response to the count of the first and second counter means.

4. A plotter for plotting data in a selected print region, comprising:
   A. a conversion means for converting input plot data into raster data;
   B. shift circuit means connected to said conversion means for receiving raster data from said conversion means, said shift circuit means comprising: print control means for generating and outputting a print enable signal, and output means for outputting raster data received from said conversion means at a time different from the time of outputting of the print enable signal, the time difference being determined by a shift value, said output means comprising shift control means for controlling a shift signal which has the same pulse width as the print enable signal and which begins at a time different from the time the print enable signal begins; and second memory means for storing the raster data received from the conversion means and outputting the raster data upon receipt of the shift signal;

C. a print means having a print head and connected to said shift circuit means for receiving the raster data outputted by said output means and the print enable signal outputted by said print control means, and for plotting figures represented by the plot data in response to receipt of the print enable signal;

D. input means connected to said shift circuit means for supplying the shift value thereto; and E. memory means connected to said input means for storing the shift value.

5. A plotter as claimed in claim 4 wherein the shift control means includes:

A. third counter means for counting the sum of the left margin dot length, the input shift value, and the total dot length of the print head of the print means;

B. fourth counting means for counting the sum of the left margin dot length and the shift value; and C. second logic means for generating the shift control signal in response to the count of the third and fourth counter means.

* * * * *